United States Patent [19]

Brown, Jr.

[11] 4,103,593

[45] Aug. 1, 1978

[54] HYDRAULIC BRAKE BOOSTER AND SHIELD THEREFOR

[75] Inventor: Arthur K. Brown, Jr., South Bend, Ind.

[73] Assignee: The Bendix Corporation, Southfield, Mich.

[21] Appl. No.: 732,573

[22] Filed: Oct. 15, 1976

[51] Int. Cl.² .......................... F15B 21/04; F16J 15/18
[52] U.S. Cl. ........................................... 92/78; 92/168
[58] Field of Search .................... 92/78, 87, 6 R, 6 D, 92/108, 168, 65, 62, 75; 91/391 R, 328

[56] References Cited

U.S. PATENT DOCUMENTS

| | | | |
|---|---|---|---|
| 1,727,398 | 9/1929 | Farmer et al. | 92/78 |
| 1,939,845 | 12/1933 | Farmer | 92/78 |
| 1,964,029 | 6/1934 | Brackenbury | 92/78 |
| 2,005,387 | 6/1935 | Pelton | 92/65 |
| 2,142,190 | 1/1939 | Hewitt | 92/78 |
| 2,367,185 | 1/1945 | Cary | 92/87 |
| 2,545,506 | 3/1951 | Walsh | 92/87 |
| 2,722,402 | 11/1955 | Crookston | 92/62 |
| 3,713,364 | 1/1973 | Francia | 92/65 |

*Primary Examiner*—Paul E. Maslousky
*Attorney, Agent, or Firm*—Paul David Schoenle; Ken C. Decker

[57] ABSTRACT

A hydraulic brake booster includes a housing that defines a pressure chamber. A piston slidably mounted in a housing bore is responsive to increasing pressures in the pressure chamber to move relative to the housing to actuate a braking mechanism, such as a master cylinder. The piston carries a sealing ring to slidingly seal the piston to the housing bore and a shield to protect the surface of the housing bore from atmospheric contaminates during long periods, when the hydraulic booster is in a brake-release position. The shield releasably connects to the piston and telescopes into a piston cavity for compact assembly with the piston.

7 Claims, 2 Drawing Figures

HYDRAULIC BRAKE BOOSTER AND SHIELD THEREFOR

BACKGROUND OF THE INVENTION

A hydraulic brake booster provides a power assist to a motor vehicle master cylinder to effect braking. The power assist is provided by a piston which is responsive to increasing pressures in a pressure chamber formed by a hydraulic brake booster housing. A spool valve within the housing communicates pressurized fluid from a power steering pump to the pressure chamber and the piston moves in response thereto to actuate the master cylinder.

Generally, the hydraulic brake booster housing carries a sealing ring in a groove in a housing bore which engages the piston to slidingly seal the piston to the housing. In view of the difficulty in machining the housing groove and keeping it clean before the sealing ring is inserted in the housing groove, it is desirable to provide a groove on the piston, which carries the sealing ring. However, with the housing bore exposed to atmosphere and the piston and sealing ring sliding on the bore surface, it is also desirable to provide a shield which protects or isolates the housing bore from the atmosphere.

SUMMARY OF THE INVENTION

The present invention relates to a hydraulic brake booster which developes a power assist for a motor vehicle master cylinder to actuate braking. In accordance with the invention a sealing ring is disposed in a groove on a piston, and the piston is slidably mounted in a hydraulic brake booster housing bore. A plastic shield is releasably connected to the piston to overlap the housing bore, thereby protecting and isolating the housing bore within which the piston is slidably mounted.

The hydraulic brake booster housing defines a pressure chamber and the piston is responsive to increasing pressures in the pressure chamber to move relative to the housing. The piston includes a cylindrical opening or cavity remote from the pressure chamber and the plastic shield telescopes into the cavity. An inturned flange in the piston cavity is disposed opposite a ridge on the shield to interlock the shield and the piston. The shield is able to contract radially to a diameter smaller than the inside diameter of the inturned flange on the piston so that the shield and the poston can be connected and disconnected. A plurality of recesses on the piston face the housing bore and retain lubricant therein for lubricating the sliding contact between the piston and housing.

The plastic shield includes a central cylindrical portion adjacent the ridge and terminates in a lip remote from the ridge, which sealingly engages the housing bore. The cylindrical portion of the shield is smaller in diameter than the inside diameter of the inturned flange so that the piston is movable with respect to the shield whenever the inturned flange on the piston is axially movable within the cylindrical portion of the shield.

DETAILED DESCRIPTION

Figure 1:
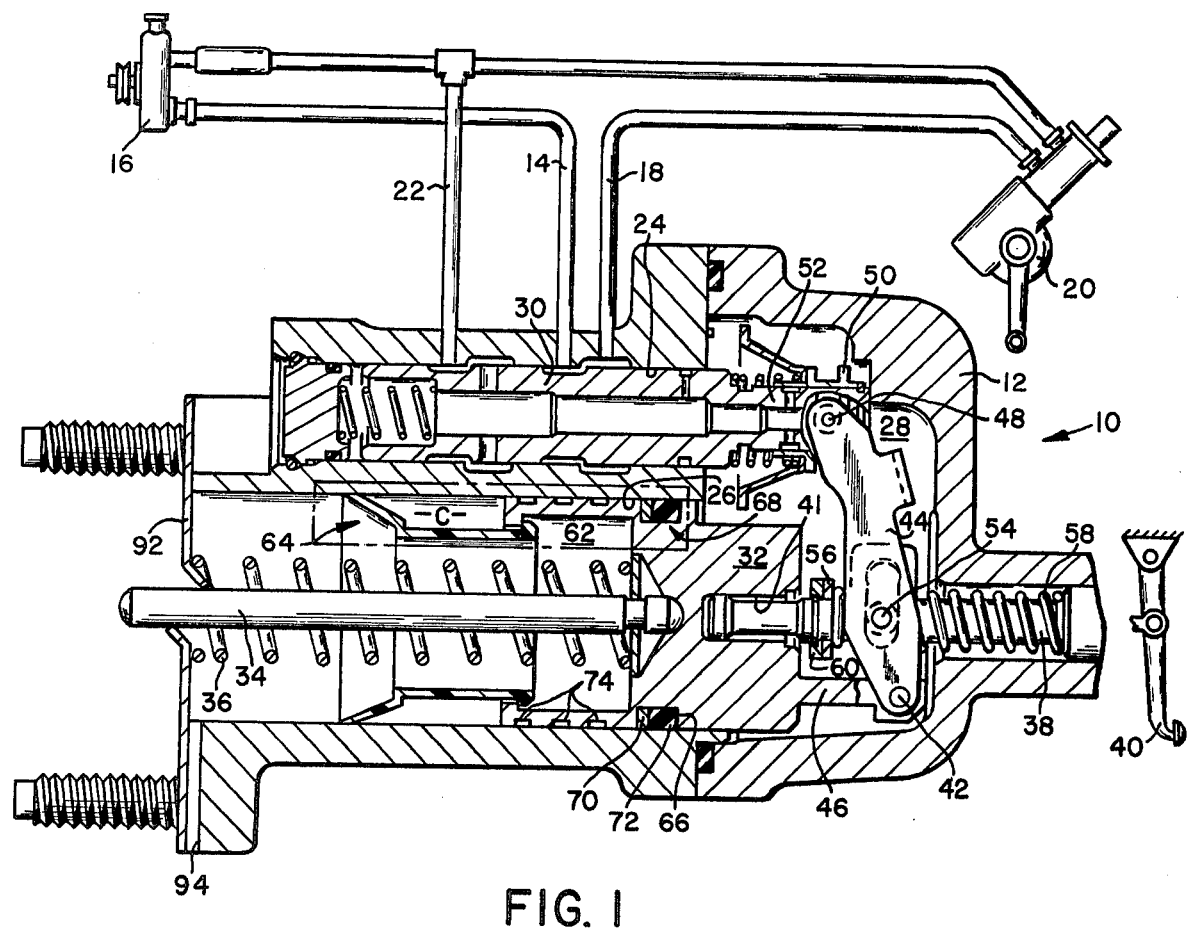
FIG. 1 is a schematic view of a vehicle hydraulic system with a brake booster made pursuant to the present invention and illustrated in cross section.

Referring now to the drawings, the brake booster 10 includes a housing 12 and an inlet 14 communicated to the outlet or high pressure side of the vehicle's power steering pump 16, an outlet port 18 which is communicated to the inlet of the vehicle's power steering gear 20, and a return or exhaust port 22. The outlet of the power steering gear 20 and the return port 22 are each communicated to a reservoir (not shown) at the inlet of the power steering pump 16.

The housing 12 defines a first bore 24, a second bore 26, and a pressure chamber 28 therewithin. A spool valve 30 is slidably mounted in the bore 24 and is adapted to control communication between the ports 14, 18 and 22 as is well known in the art. A piston 32 is slidably mounted in the bore 26 and projects into the pressure chamber 28. A rod 34 connects the piston 32 with a standard automotive master cylinder (not shown) mounted to the left of the housing 12. A spring 36 yieldably urges the piston 32 to the right viewing FIG. 1, toward the brake-release position. One end of a control rod 38 is connected to a brake pedal 40 which is mounted in the operator's compartment of the vehicle, and the other end of the rod 38 is slidably received in a blind bore 41 provided in the piston 32. A first pivot 42 connects one end of a lever 44 to a bracket 46 integral with piston 32. A second pivot 48 connects the other end of the lever 44 to a cap member 50 which is slidably mounted on the reduced diameter portion 52 of the spool valve 30 which extends into the pressure chamber 28. A third pivot 54 connects the lever 44 to a bracket 56 which slides on the rod 38. A spring 58 yieldably urges the bracket 56 into engagement with a retainer 60 fixed to the rod 38.

In the preferred embodiment of the invention, the piston 32 includes a cavity 62 on the end of the piston remote from the pressure chamber 28. The cavity 62 receives the rod 34, the spring 36 and a shield 64. An annular groove 66 on the piston 32 faces the housing bore 26 and carries a sealing ring 68 therein. The sealing ring 68 generally comprises a washer 70 and an elastomeric element 72; however, other conventional sealing rings may be disposed in the groove 66. Recesses at 74 retain lubricant for greasing the surfaces of the piston 32 and the housing bore 26 when the piston 32 moves in the bore 26, so that the piston 32 slides freely in the housing bore 26.

Figure 2:
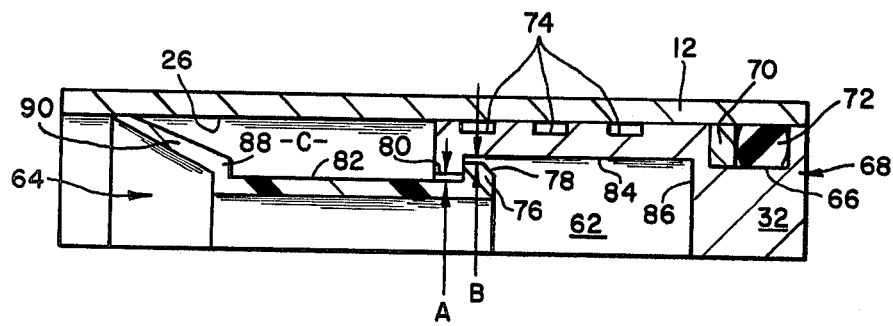
FIG. 2 is an enlarged detailed view of the circumscribed portion of FIG. 1.

Turning to FIG. 2, it is seen that the shield 64 forms a ridge 76 at the end leading or telescoping into the cavity 62. A frusto-conical surface 78 on the ridge is engageable with a radially, inturned flange 80 on the piston to radially contract the shield when the ridge is axially moved during assembly from the left of the flange 80 to the right thereof, viewing the FIGS. The ridge 76 is larger in diameter than the diameter across the flange so that the ridge opposes the flange to interconnect the shield and the piston. In addition, a cylindrical portion 82 on the shield is smaller in diameter than the diameter across the flange 80 to form a clearance A and a cylindrical portion 84 on the piston cavity 62 is larger in diameter than the ridge 76 to form a clearance B, substantially equal to clearance A, so that the piston is free to move axially toward the shield to the left, viewing the figures, until the shield abuts the cavity wall 86 and the flange 80 abuts a transverse shoulder 88 on the shield 64, whereupon the shield 64 and the piston 32 move to the left together.

The shield terminates in a radially outwardly extending lip 90 remote from the ridge 76, that frictionally and sealingly engages the housing bore 26. As the lip 90 is frictionally engaged to the housing bore 26, the piston generally moves relative to the housing and the shield as long as the ridge 76 on the shield is axially disposed between the flange 80 and the wall 86. With the ridge 76 axially disposed between the flange 80 and the wall 86, the clearances A and B vent the space C between the shield 64 and the housing bore 26 to atmosphere via opening 94 in the housing 12, so that no pressure buildup occurs in space C when the ridge 80 moves toward the transverse shoulder 88.

MODE OF OPERATION

A motor vehicle operator steps on the brake pedal 40 to effect a brake application. When the brake pedal is stepped on, the spool valve 30 moves within bore 24 to communicate the inlet port 14 with the pressure chamber 28, thereby increasing the pressure in chamber 28. This pressure communicates into pressure chamber 28 to move the piston 32 to the left, viewing the FIGS., to move the rod 34 to actuate a master brake cylinder (not shown) to effect braking. If an insufficient amount of pressure is communicated to the pressure chamber from the inlet port 14 or a reservoir system (not shown), the rod 38 is urged to the left by further brake pedal movement to engage the piston 32 and move the piston to the left to engage the rod 34 with the master cylinder to actuate braking.

Regardless of the input used to move the piston 32, the piston recesses 74 and the piston sealing ring 68 move axially with the piston 32. The sealing ring sealingly slides on the housing bore 26 to seal the pressure chamber 28 from the atmosphere at the open end of housing bore 28 via opening 94.

In the brake-release position, illustrated in the FIGS., the right side wall of flange 80 on piston 32 abuts the left face of ridge 76 to close the space C at atmosphere. Therefore, the housing bore 26 from the pressure chamber 28 to the lip 90 is isolated or protected from the atmosphere and the contaminates therein.

When the piston 32 moves to the left during a braking application, the flange 80 separates from the ridge 76 to open the space C to atmosphere. The piston moves further to the left until the flange 80 abuts the transverse shoulder 88 and the ridge 76 abuts the piston wall 86 whereupon the piston 32 and the shield 64 move to the left together. A plate 92 acts as a stop to limit the movement of the shield to the left. When the brake pedal 40 is released, the spring 36 urges the piston to the right. As the lip 90 of the shield is frictionally in contact with the housing bore 26, initially only the piston 32 moves to the right until the flange 80 engages the ridge 76 whereupon both the piston 32 and the shield 76 move to the right to return to the brake-release position illustrated in the FIGS.

Although the space C and the corresponding housing bore are open to atmosphere during braking when the piston flange 80 is axially separated from the shield ridge 76, the portion of the housing bore 26 between the lip 90 and the pressure chamber 28 is protected from the atmosphere most of the time since of the amount of time spent braking during the life of the motor vehicle is relatively small.

I claim:

1. A hydraulic brake booster comprising:
a housing defining a pressure chamber;
a piston slidably mounted in a bore in said housing, said piston being responsive to increasing pressure in the pressure chamber to move a shield connecting the piston with a wall of the housing bore in a non-braking position, which said piston moves during braking to isolate that portion from atmosphere, said shield also sealingly and slidingly engaging the wall of the housing bore, said shield being engageable with said piston when the latter is in the non-braking position and being spaced from said piston when said piston moves to a braking position.

2. A hydraulic brake booster comprising:
a housing defining a pressure chamber and having a bore opening thereto;
a piston slidably mounted in the bore in said housing, said piston being responsive to pressure within the pressure chamber to move relative to said housing to actuate braking, said piston having a cavity remote from the pressure chamber; and
a shield telescoping into the piston cavity and interconnecting with said piston, said shield cooperating with a wall of said housing bore and said piston to substantially define a space, said shield being engageable with said piston to enclose said space and said shield being movable into said piston cavity to open said space.

3. A hydraulic brake booster comprising:
a housing defining a pressure chamber;
a piston slidably mounted in a bore in said housing, said piston being responsive to increasing pressure in the pressure chamber to move relative to the housing to actuate braking; and
a shield disposed within said housing bore, said shield overlapping a portion of a wall of the bore through which said piston moves during braking and cooperating with said piston to isolate that portion from atmosphere, said shield also sealingly and slidingly engaging the wall of the housing bore;
said shield being radially contracted to releasably connect with said piston and the end of said shield remote from said piston forming a lip that sealingly and slidingly engages the wall of said housing bore.

4. The hydraulic brake booster of claim 3 in which said piston includes a cavity at the end thereof remote from the pressure chamber and said piston forms a radially inturned flange extending into the cavity, said shield extending axially into said cavity and including a ridge which opposes the flange to connect said shield to said piston.

5. A hydraulic brake booster comprising:
a housing defining a pressure chamber;
a piston slidably mounted in a bore in said housing, said piston being responsive to increasing pressure in the pressure chamber to move relative to the housing to actuate braking; and
a shield disposed within said housing bore, said shield overlapping a portion of a wall of the bore through which said piston moves during braking and cooperating with said piston to isolate that portion from atmosphere, said shield also sealingly and slidingly engaging the wall of the housing bore;
said shield cooperating with the wall of the housing bore and said piston to seal the portion of the wall of the bore when said piston is in a non-braking position and to open the portion of the wall of the bore to atmosphere when said piston is in a braking position by means of at least one clearance between said shield and said piston.

6. A hydraulic brake booster comprising:
a housing defining a pressure chamber;
a piston slidably mounted in a bore in said housing, said piston being responsive to increasing pressure in the pressure chamber to move relative to the housing to actuate braking; and
a shield disposed within said housing bore, said shield overlapping a portion of a wall of the bore through which said piston moves during braking and cooperating with said piston to isolate that portion from atmosphere, said shield also sealingly and slidingly engaging the wall of the housing bore;
one end of said shield being sealingly engageable with the wall of said housing bore and said piston being movable relative to the other end of said shield when said piston is axially movable relative to the wall of said housing bore.

7. The hydraulic brake booster of claim 6 in which said piston is movable axially relative to the housing during braking and said shield other end is fixed relative to the housing throughout a portion of said piston movement and is movable with said piston relative to the housing throughout the remainder of said piston movement.

* * * * *

UNITED STATES PATENT AND TRADEMARK OFFICE
CERTIFICATE OF CORRECTION

PATENT NO. : 4,103,593

DATED : August 1, 1978

INVENTOR(S) : Arthur K. Brown, Jr.

It is certified that error appears in the above-identified patent and that said Letters Patent are hereby corrected as shown below:

Column 4, line 3, after "move", insert --- relative to the housing to actuate braking; and---.

Column 4, line 5, after "position," insert ---said shield extending axially and overlapping a portion of the bore through---.

Signed and Sealed this

Sixth Day of November 1979

[SEAL]

Attest:

RUTH C. MASON
Attesting Officer

LUTRELLE F. PARKER
Acting Commissioner of Patents and Trademarks